US011117654B2

(12) United States Patent
Acee et al.

(10) Patent No.: US 11,117,654 B2
(45) Date of Patent: Sep. 14, 2021

(54) TAIL ROTOR CYCLIC CONTROL FOR PITCH ATTITUDE ADJUSTMENT

(71) Applicant: Bell Helicopter Textron Inc., Fort Worth, TX (US)

(72) Inventors: Aaron Alexander Acee, Flower Mound, TX (US); Andrew Paul Haldeman, Fort Worth, TX (US); Colin John Thomas, Carrollton, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 405 days.

(21) Appl. No.: 16/277,504

(22) Filed: Feb. 15, 2019

(65) Prior Publication Data

US 2020/0262552 A1 Aug. 20, 2020

(51) Int. Cl.
*B64C 27/82* (2006.01)
*B64C 27/78* (2006.01)
*B64C 27/08* (2006.01)

(52) U.S. Cl.
CPC .............. *B64C 27/78* (2013.01); *B64C 27/08* (2013.01); *B64C 27/82* (2013.01); *B64C 2027/8218* (2013.01)

(58) Field of Classification Search
CPC ......... B64C 27/78; B64C 27/82; B64C 27/52; B64C 27/58; B64C 27/59; B64C 27/605; B64C 2027/8218; B64C 29/0033
See application file for complete search history.

(56) References Cited

U.S. PATENT DOCUMENTS

| 5,597,138 A * | 1/1997 | Arlton .................... A63H 27/12 244/17.13 |
| 9,365,289 B2 * | 6/2016 | Prud'Homme-Lacroix ................ B64C 27/56 |
| 2015/0166175 A1 * | 6/2015 | Prud'Homme-Lacroix ................ B64C 27/52 244/17.21 |

* cited by examiner

*Primary Examiner* — Richard R. Green
*Assistant Examiner* — Michael A. Fabula
(74) *Attorney, Agent, or Firm* — Shackelford, Bowen, McKinley & Norton, LLP

(57) ABSTRACT

A method of controlling a tail rotor system includes pivoting a swashplate of the tail rotor system about an axis passing through a diameter of the swashplate. Pivoting the swashplate causes a first linkage of a first pair of linkages coupled between the swashplate and a collective crosshead to move in a first direction and a second linkage of the first pair of linkages coupled between the swashplate and the collective crosshead to move in a second direction that is opposite the first direction. The movement of the first and second linkages causes a plane of rotation of a pair of rotors of the tail rotor system to cant relative to a centerline of a mast of the tail rotor system. A tail rotor system is also disclosed.

20 Claims, 6 Drawing Sheets

TAIL ROTOR CYCLIC CONTROL FOR PITCH ATTITUDE ADJUSTMENT

BACKGROUND

This section provides background information to facilitate a better understanding of the various aspects of the disclosure. It should be understood that the statements in this section of this document are to be read in this light, and not as admissions of prior art.

Helicopters typically include a main rotor that rotates in a generally horizontal plane above the helicopter airframe and a tail rotor mounted on a tail boom and rotating in a generally vertical plane oriented to produce a sideways thrust in the direction of yaw. The pitch of the tail rotor blades, i.e., the angle between the chord line of the blade profile and the direction of rotation of the tail rotor, can be varied so as to increase or decrease the amount of sideways thrust produced by the tail rotor. The sideways thrust of the tail rotor serves three related purposes: first, since the tail rotor is located on a tail boom a distance from the main rotor, its sideways thrust produces a moment which serves to offset the torque produced on the airframe of the helicopter by the rotation of the main rotor blade; second, the sideways thrust of the tail rotor provides yaw axis control for the helicopter; and third, the sideways thrust of the tail rotor may work in conjunction with sideways thrust of the main rotor when the helicopter is translating laterally through the air.

The total sideways thrust produced by the tail rotor is known as the tail rotor authority. Factors affecting the total authority produced by a tail rotor include blade size and profile, rotational speed, angle of attack of the tail rotor blades, the pitch of the tail rotor blades, and the air density. The angle of attack is the angle between the chord line of the blade profile and the "relative wind", i.e., the direction at which the air approaches the tail rotor blade. This angle of attack is affected by the rotor blade pitch, the direction of travel of the helicopter and the presence of cross winds. A cross wind that reduces the angle of attack reduces the overall authority produced by the tail rotor, diminishing the control available to the pilot. The pitch is the angle between the chord line of the blade profile and the direction of blade rotation. The pitch is not affected by cross winds. The pilot controls the pitch of the tail rotor blades through the use of control pedals. Increasing the blade pitch results in greater tail rotor authority and decreasing the blade pitch results in less tail rotor authority. Air density also affects the tail rotor authority. Other factors being equal, the greater the air density, the greater the authority produced by the tail rotor, and similarly, the lower the air density, the less authority produced by the tail rotor.

During operation of a helicopter, a pilot may sometimes have difficulty seeing his or her surroundings, especially areas below the helicopter. Some helicopters include see through panels located on lower portions of the airframe to improve the pilot's ability to see beneath the helicopter.

SUMMARY

An illustrative tail rotor system includes a mast, a yoke coupled to the mast and comprising a pair of rotors, a swashplate disposed concentric to the mast and configured to pivot relative to the mast, the swashplate comprising a fixed ring and a rotatable ring, and a collective crosshead movably coupled to the mast and coupled to the swashplate via a first pair of linkages and to the pair of rotors via a second pair of linkages.

An illustrative method of controlling a tail rotor system of a helicopter includes pivoting a swashplate of the tail rotor system about an axis passing through a diameter of the swashplate. Responsive to the pivoting, moving a first linkage of a first pair of linkages coupled between the swashplate and a collective crosshead in a first direction and moving a second linkage of the first pair of linkages coupled between the swashplate and the collective crosshead in a second direction that is opposite the first direction. Responsive to the movement of the first and second linkages, causing a plane of rotation of a pair of rotors of the tail rotor system to cant relative to a centerline of a mast of the tail rotor system.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1A:
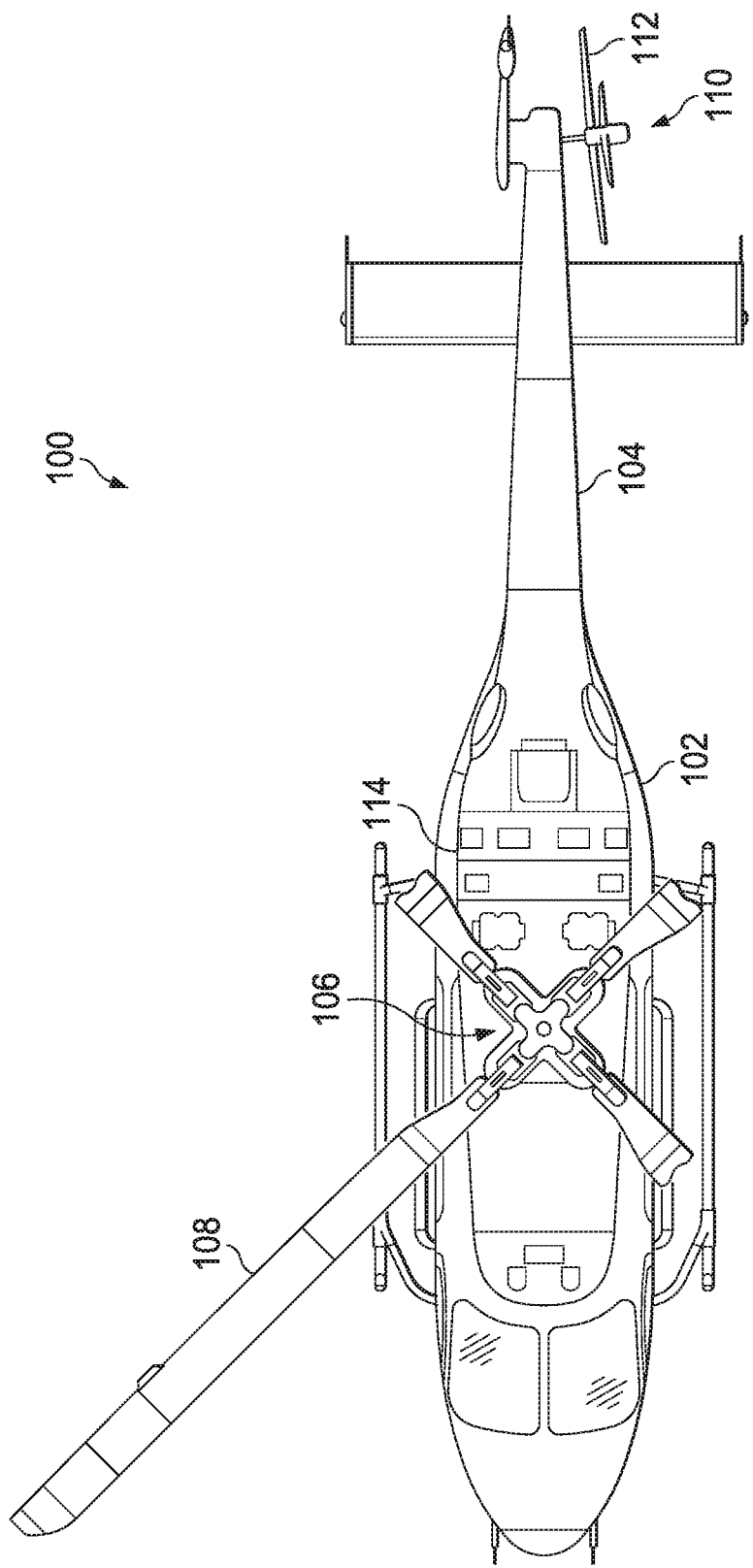
FIGS. 1A and 1B illustrate top and side views, respectively, of a helicopter according to aspects of the disclosure.

It is to be understood that the following disclosure provides many different aspects, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1B:
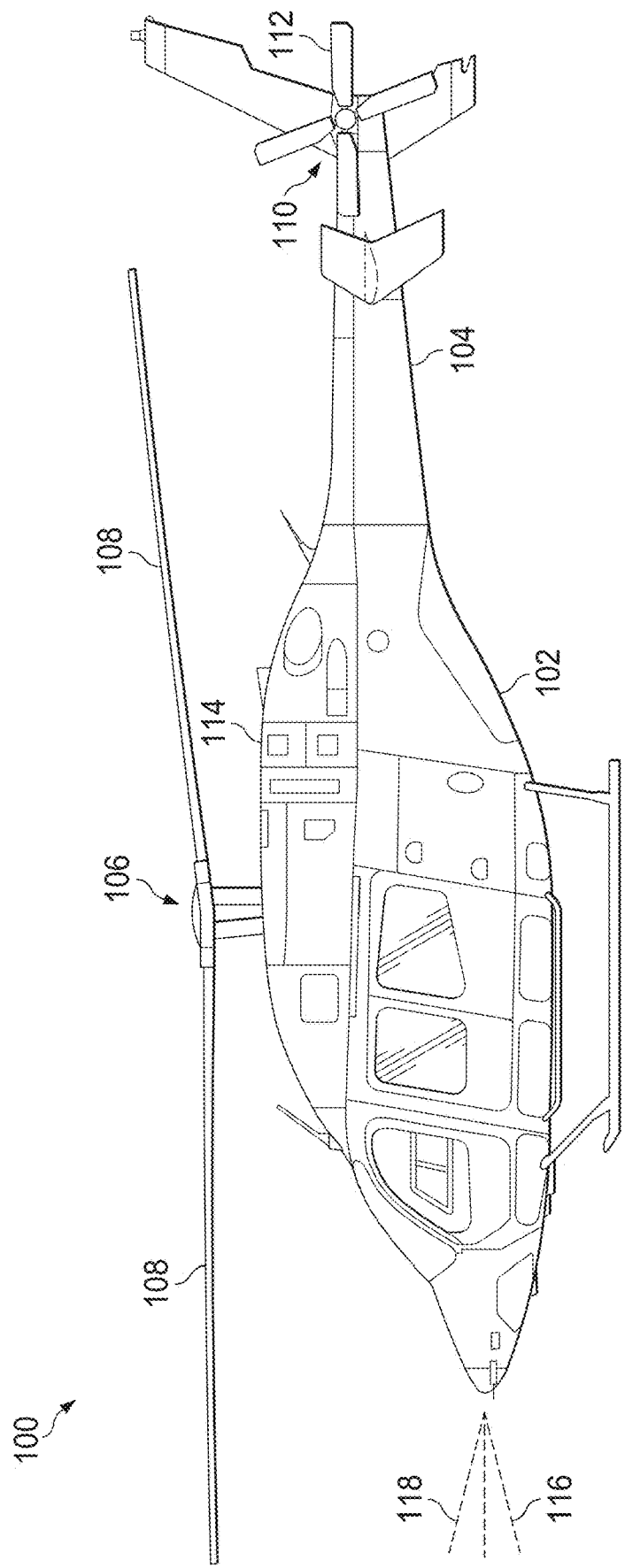

FIGS. 1A and 1B illustrate a top view and a side view, respectively, of a helicopter 100 according to aspects of the disclosure. Helicopter 100 includes an airframe 102 with a tail boom 104. Helicopter 100 also includes a main rotor system 106 that includes a plurality of main rotors 108 and a tail rotor system 110 that includes a plurality or tail rotors 112. Main rotor system 106 and tail rotor system 110 are powered by a power system 114. Power system 114 includes at least one engine that provides torque to rotor systems 106, 110.

Figure 2:
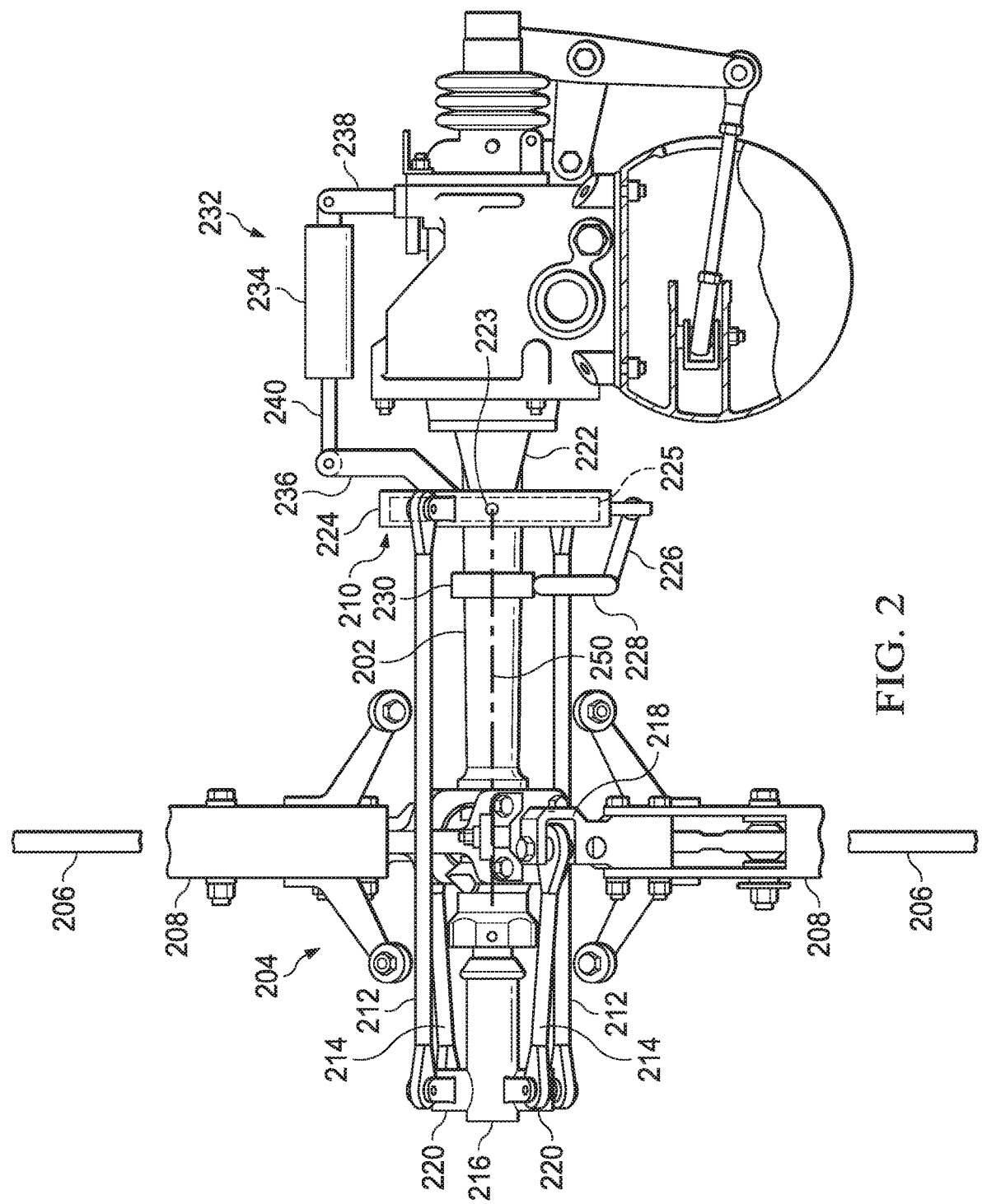
FIG. 2 illustrates a tail rotor system according to aspects of the disclosure.

Referring now to FIG. 2, side and top views of an illustrative tail rotor system 200 according to aspects of the disclosure are shown. Tail rotor system 200 may be implemented in place of tail rotor system 110 of helicopter 100. Tail rotor system 200 includes a mast 202 connected to a yoke 204. Yoke 204 transmits torque from mast 202 to rotors 206.

Rotors 206 are coupled to yoke 204 via grips 208. One or more bearings may be used to secure rotors 206 to yoke 204 and to dampen vibrations and loads experienced during operation of tail rotor system 200. Each grip 208 includes a pitch horn 218 that extends away from grip 208. Pitch horns 218 are used as leverage to manipulate pitch of rotors 206.

Pitch of rotors 206 is controlled with a collective crosshead 216. Collective crosshead 216 is movably coupled to mast 202 so that collective crosshead 216 translates axially along axis 250 (e.g., centerline of mast 202). For example, collective crosshead 216 can be coupled to an actuator disposed within mast 202. Collective crosshead 216 is also coupled to pitch horns 218 of rotors 206 by a pair of linkages 214 and to a swashplate 210 by a pair of linkages 212. Linkages 212, 214 are coupled to collective crosshead by a pair of mixing levers 220 (see also FIG. 3). To change the pitch of rotors 206, collective crosshead 216 moves axially toward or away from swashplate 210. As collective crosshead 216 translates axially, linkages 212, 214 interact with mixing levers 220 to alter the pitch of rotors 206. Operation of collective crosshead 216 is described in more detail below.

Swashplate 210 is concentric to mast 202 and pivotally coupled to a swashplate support 222 so that swashplate 210 can pivot about axis 223. In some embodiments, axis 223 passes through a diameter of swashplate 210 and is oriented generally parallel with an axis running through a center of tail boom 104. Generally parallel is used herein to mean within ten degrees of parallel. Swashplate 210 includes an inner ring 225 that is coupled to swashplate support 222 and an outer ring 224 that is movably coupled to the inner ring 225 so that outer ring 224 may rotate relative to swashplate support 222. For example, a plurality of bearings may be disposed between inner ring 225 and outer ring 224. Outer ring 224 is coupled to mast 202 via swashplate drive linkages 226, 228 and a coupling 230. Swashplate drive linkage 226 is pivotally connected between outer ring 224 and swashplate drive linkage 228. Swashplate drive linkage 228 is pivotally connected between swashplate drive linkage 226 and coupling 230. Coupling 230 is configured to slide along mast 202 while also transmitting torque to outer ring 224. For example, coupling 230 can include spines, teeth, and the like that mate up with complementary splines, teeth, and the like on an outer surface of mast 202.

Tail rotor system 200 also includes a cyclic control system 232. Cyclic control system 232 controls an orientation of swashplate 210 about axis 223. Cyclic control system 232 includes an actuator 234 that is coupled to the inner ring 225 of swashplate 210 by a linkage 236. A support 238 anchors actuator 234 to tail rotor system 200. Support 238 can be coupled to tail boom 104, a gearbox of tail rotor system 200 (e.g., as shown in FIG. 2), or other structure of tail rotor system 200. Actuator 234 includes an arm 240 that can extend and retract. Actuator 234 can be a hydraulic, electric, or pneumatic actuator. Extending arm 240 causes swashplate 210 to cant downward and retracting arm 240 causes swashplate 210 to cant upward. Canting swashplate 210 downward causes the plane of rotation of rotors 206 to also cant downward because of the interaction between linkages 212 with mixing levers 220. Canting swashplate 210 upward similarly causes the plane of rotation of rotors 206 to also cant upward.

Figure 3:
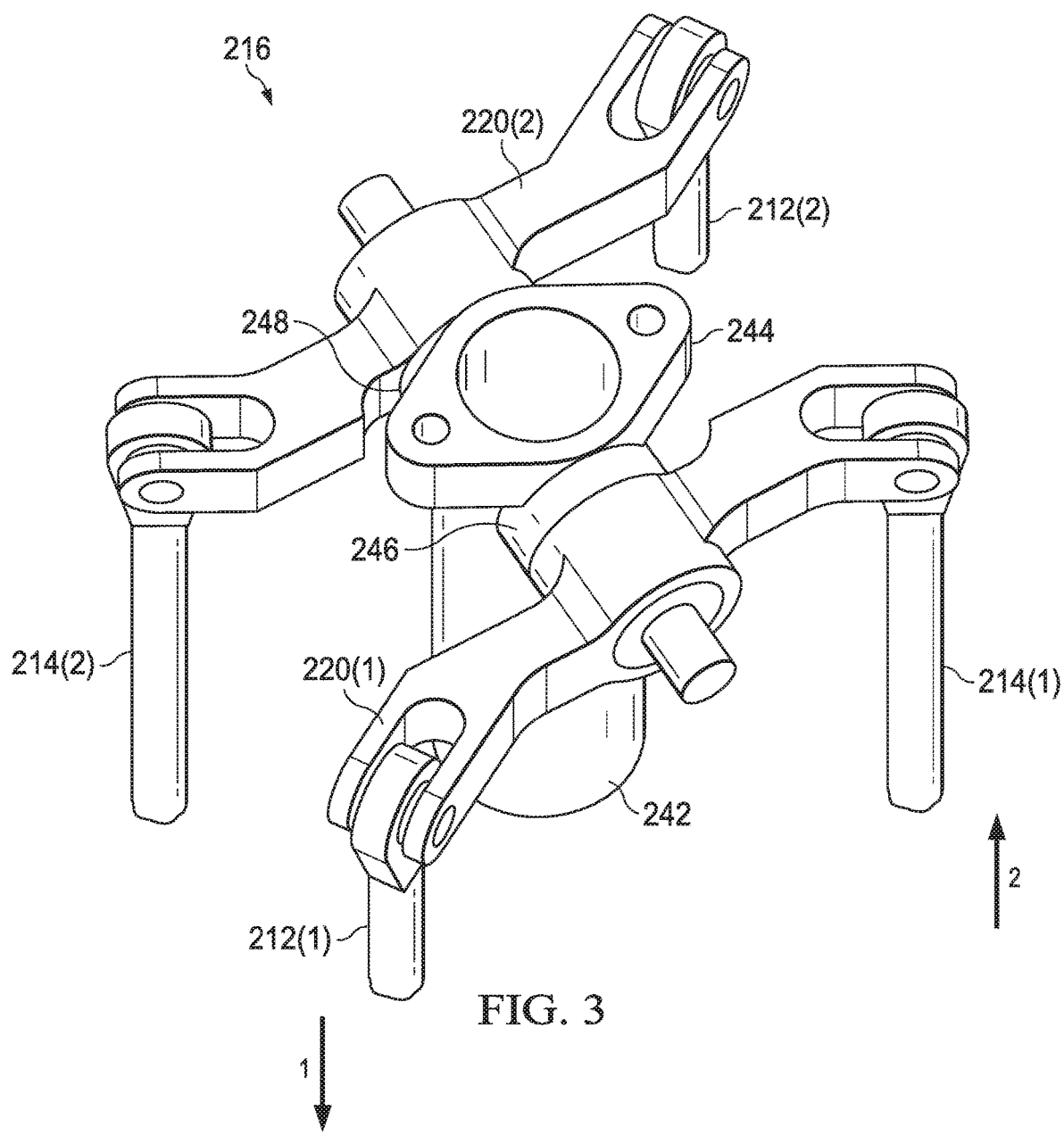
FIG. 3 illustrates a collective crosshead of the tail rotor system of FIGS. 2A-2B according to aspects of the disclosure.

Referring now to FIG. 3, a partial view of collective crosshead 216 according to aspects of the disclosure is shown. Collective crosshead 216 includes a body 242 that is axially aligned with mast 202. Body 242 includes a trunnion 244 with shafts 246, 248 on which mixing levers 220(1), 220(2) are seated, respectively. Mixing levers 220(1), 220(2) are permitted to pivot about shafts 246, 248. When swashplate 210 is canted in a first direction, mixing lever 220(1) pivots so that linkage 212(1) translates in the direction of arrow 1 and linkage 214(1) translates in the direction of arrow 2. Mixing lever 220(2) pivots in the same direction as mixing lever 220(1) so that linkage 212(2) translates in the direction of arrow 2 and linkage 214(2) translates in the direction of arrow 1. The translation of linkages 214(1), 214(2) cants the plane of rotation of rotors 206. When swashplate 210 is pivoted in an opposite direction, the plane of rotation of rotors 206 cants in the opposite direction.

To provide pure collective input, tail rotor system 200 operates as described below. Swashplate 210 is oriented in a default position (as shown in FIG. 2) and collective crosshead 216 translates along an axis 250 (e.g., the mast centerline), the linkages 212(1), 212(2) effectively become a fixed pivot point that mixing levers 220(1), 220(2) pivot about. As collective crosshead 216 translates, mixing levers 220(1), 220(2) pivot, which causes linkages 214(1), 214(2) to pitch rotors 206.

To provide pure cyclic input, tail rotor system 200 operates as described below. with collective crosshead 216 held in a fixed position, swashplate 210 is can be tilted/canted by cyclic control system 232. As swashplate 210 cants, linkages 212(1), 212(2) move the same distance, but in opposite directions (linkages 212(1), 212(2) are spaced 180 degrees from each other on outer ring 224). In this scenario, shafts 246, 248 on collective crosshead 216 become fixed pivot points that mixing levers 220(1), 220(2) pivot about. As mixing levers 220(1), 220(2) pivot, linkages 214(1), 214(2) are translated the same distance but in opposite directions, which inputs a cyclic input into rotors 206 (i.e. one blade pitches nose up, the other blade pitches nose down the same magnitude but opposite direction).

Conventional helicopters do not permit the cant of the tail rotor to be manipulated. Instead, the cant of the tail rotor in conventional helicopters is fixed. The ability of tail rotor system 200 to manipulate a cant of the tail rotor during flight provides several distinct advantages over conventional tail rotor systems. For example, allowing the tail rotor to cant allows the pilot to change the pitch of helicopter 100. For example, when swashplate 210 is canted down, a component of the thrust vector generated by tail rotor system 200 is in the downward direction. This downward thrust causes the nose of helicopter 100 to pitch down (e.g., toward line 116 in FIG. 1B). Pitching the nose down can increase the pilot's ability to see areas below and in front of the helicopter. The nose can be pitched down in a hover or during flight. Additionally, because canting swashplate 210 down increases the amount of downward thrust being produced by helicopter 100, the ability of helicopter 100 to hover is improved. Thus, tail rotor system 200 allows helicopter 100 to hover at higher altitudes and with increased payload. Similarly, swashplate 210 can be canted up to generate thrust in the upward direction to pitch the nose of the helicopter up (e.g., toward line 118 in FIG. 1B).

Canting the tail rotor up and down can also be used to adjust the center of gravity envelope. For example, adding cargo to the helicopter alters the center of gravity of the helicopter. The location of the center of gravity affects the helicopter's attitude during a hover and in flight. Using tail rotor system 200, the pitch of the tail rotor can be raised or lowered to counter any undesired shift in the attitude of the helicopter caused by the shift in center of gravity.

Figure 4:
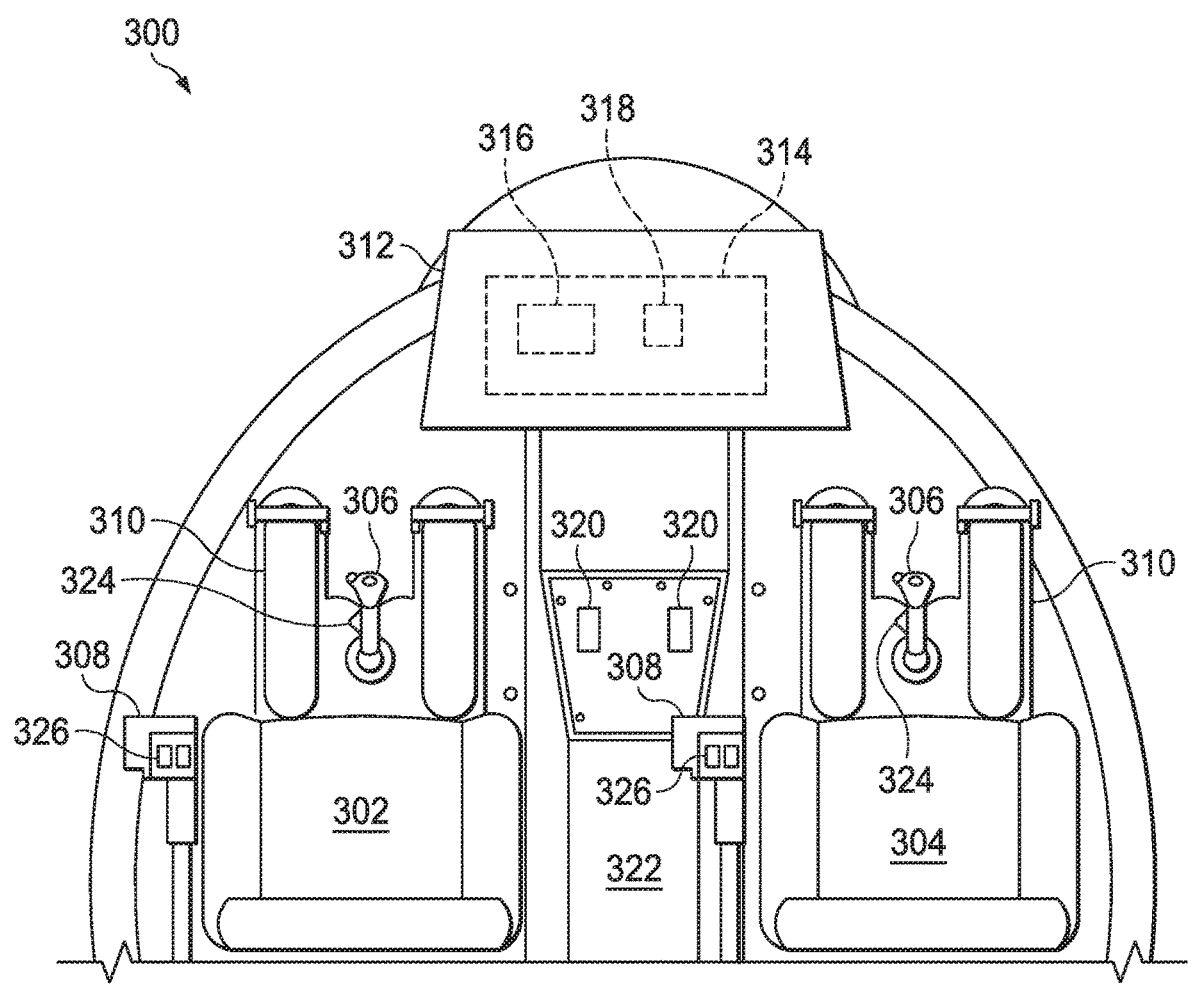
FIG. 4 is an illustrative view of a cockpit of a helicopter according to aspects of the disclosure.

Referring now to FIG. 4, an illustrative view of a cockpit 300 of a helicopter according to aspects of the disclosure is shown. In some aspects, helicopter 100 includes cockpit 300. Cockpit 300 includes a pilot seat 302 and a co-pilot seat 304. Each seat 302, 304 includes a cyclic control 306, a collective control 308, and pedal controls 310. In other aspects, the helicopter may be a single seater helicopter without a co-pilot seat 304. Cockpit 300 also includes a console 312 that houses a flight control computer 314, displays, gauges, and various controls.

Flight control computer 314 includes a processor 316 and memory 318 and provides various functionality to help the pilot control the helicopter. In some aspects, flight control computer 314 controls the cant of swashplate 210. The cant of swashplate 210 can be set automatically by flight control computer 314 or may be set manually by the pilot. For example, flight control computer 314 may trim the cant of swashplate 210 to maintain a pitch of the helicopter at a certain orientation.

In some aspects, the pilot manually sets the cant of swashplate 210. Manual control of the cant of swashplate 210 can be implemented in various ways. For example, the cant of swashplate 210 can be adjusted by a switch 320 mounted on center console 322, by a switch 324 mounted on cyclic control 306, a switch 326 mounted on collective control 308, or the like. Switches 320, 324, 326 are coupled to flight control computer 314 and can be implemented as toggles, rocker switches, thumb wheel, buttons, and the like. Inputs from switches 320, 324, 326 are received by flight control computer 314, which then uses cyclic control system to manipulate the cant of swashplate 210.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment or aspect, the terms "substantially," "approximately," "generally," "around," and "about" may be substituted with "within [a percentage] of" what is specified, where the percentage includes 0.1, 1, 5, and 10 percent.

Figure 5:
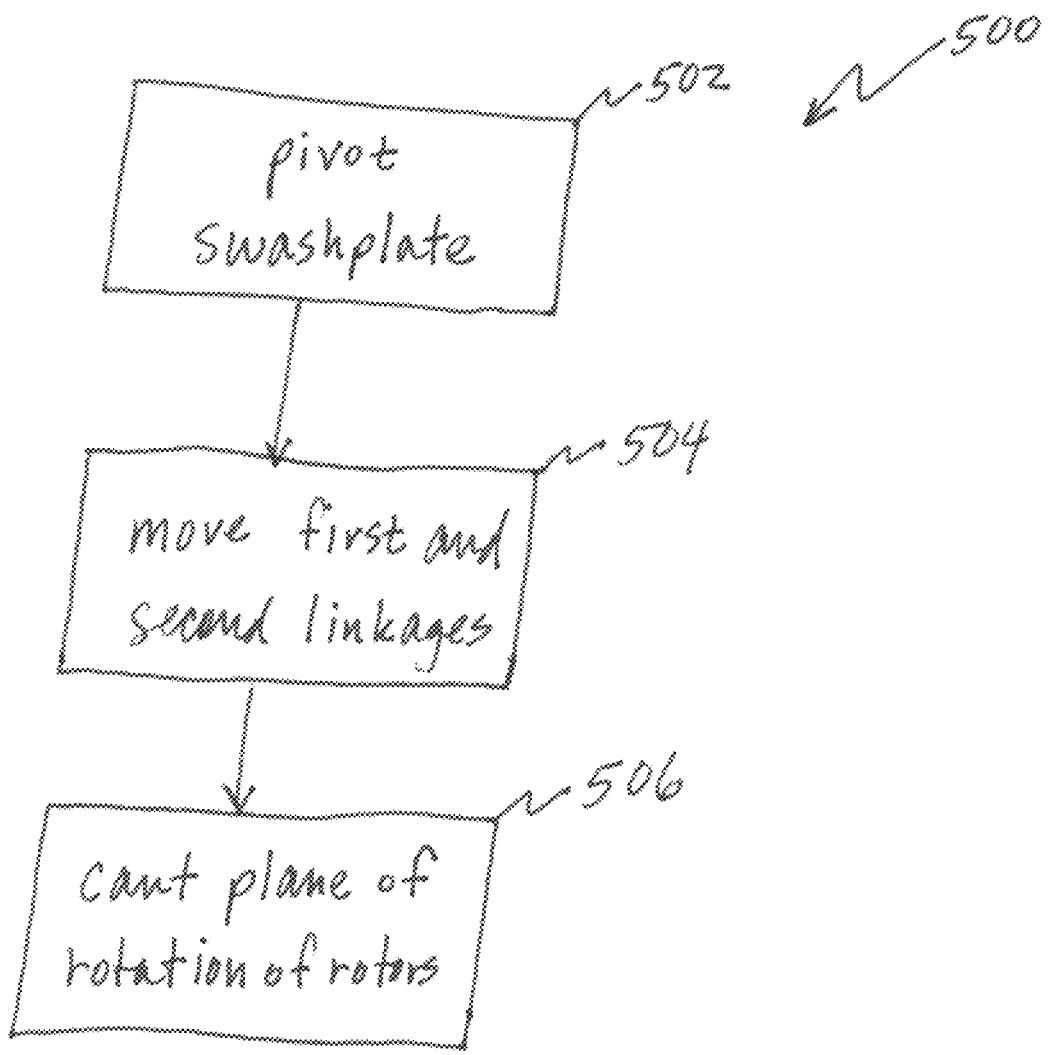
FIG. 5 illustrates a method of controlling a tail rotor system according to aspects of the disclosure.

FIG. 5 illustrates a method of controlling a tail rotor system such as that illustrated and described herein. A method 500 begins at step 502, at which step the swashplate of the tail rotor system is pivoted about an axis that passes through a diameter of the swashplate. Execution proceeds from step 502 to step 504, at which step, responsive to the step of pivoting performed at step 502, a first linkage of a first pair of linkages coupled between the swashplate and the collective crosshead is moved in a first direction and a second linkage of the first pair of linkages coupled between the swashplate and the collective crosshead in a second direction is moved opposite the first direction.

From step 504, execution proceeds to step 506, at which step, responsive to the movement of the first and second linkages at step 504, a plane of rotation of the pair of rotors of the tail rotor system is caused to cant relative to a centerline of the mast of the tail rotor system.

In some embodiments, the step of pivoting the swashplate includes an actuator coupled to a pivotable fixed ring extending or contracting the actuator to pivot the pivotable fixed ring. A pitch of the helicopter may be adjusted by a cyclic control system via adjustment of a vertical thrust vector of the tail rotor system. A center of gravity envelope of the helicopter may be adjusted by the cyclic control system via the adjustment of a vertical thrust vector of the tail rotor system. The tail rotor system may generate additional downward thrust via adjustment of a vertical thrust vector of the tail rotor system.

The foregoing outlines features of several aspects so that those skilled in the art may better understand the aspects of the disclosure. Those skilled in the art should appreciate that they may readily use the disclosure as a basis for designing or modifying other processes and structures for carrying out the same purposes and/or achieving the same advantages of the aspects introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A tail rotor system comprising: a mast;
a yoke coupled to the mast and comprising a pair of rotors;
a swashplate disposed concentric to the mast and configured to pivot relative to the mast;
wherein the swashplate comprises:
a pivotable fixed ring; and
a rotatable ring that rotates with the mast and relative to the pivotable fixed ring; and
a collective crosshead:
movably coupled to the mast;
coupled to the swashplate via a first pair of linkages; and
coupled to the pair of rotors via a second pair of linkages.

2. The tail rotor system of claim 1, wherein the collective crosshead comprises:
a body that is concentric with the mast and a trunnion disposed on the body, the trunnion comprising first and second shafts; and
a first mixing lever disposed on the first shaft and a second mixing lever disposed on the second shaft.

3. The tail rotor system of claim 2, wherein:
a first linkage of the first pair of linkages is coupled between the swashplate and the first mixing lever; and
a second linkage of the first pair of linkages is coupled between the swashplate and the second mixing lever.

4. The tail rotor system of claim 2, wherein:
a first linkage of the second pair of linkages is coupled between the first mixing lever and a first rotor of the pair of rotors; and
a second linkage of the second pair of linkages is coupled between the second mixing lever and a second rotor of the pair of rotors.

5. The tail rotor system of claim 1, further comprising a cyclic control system, the cyclic control system comprising:

an actuator coupled to the pivotable fixed ring of the swashplate;

a swashplate support coupled to the pivotable fixed ring of the swashplate and configured to allow the swashplate to pivot; and a swashplate drive linkage coupled between the rotatable ring and the mast and configured to transmit torque from the mast to the rotatable ring.

6. The tail rotor system of claim 5, wherein:

the swashplate drive linkage comprises a first swashplate drive linkage, a second swashplate drive linkage, and a coupling;

wherein the first swashplate drive linkage is coupled between the rotatable ring and the second swashplate drive linkage;

the second swashplate drive linkage is coupled between the first swashplate drive linkage and the coupling; and the coupling is disposed around the mast and is coupled to the mast to transmit torque to the rotatable ring.

7. The tail rotor system of claim 6, where the first and second swashplate drive linkages comprise pivotable connections that allow the first and second swashplate drive linkages to articulate as the swashplate pivots.

8. The tail rotor system of claim 5, further comprising a flight control computer configured to control a pivoting motion of the swashplate.

9. The tail rotor system of claim 8, further comprising a switch configured for operation by a pilot and communicatively coupled to the flight control computer to control a cant of the pair of rotors.

10. The tail rotor system of claim 5, further comprising a flight control computer configured to control the actuator of the cyclic control system to control a pivoting motion of the swashplate.

11. The tail rotor system of claim 10, further comprising a switch configured for operation by a pilot and communicatively coupled to the flight control computer to control operation of the actuator.

12. A method of controlling a tail rotor system according to claim 1 the method comprising:

pivoting the swashplate of the tail rotor system about an axis passing through a diameter of the swashplate;

responsive to the pivoting:

moving a first linkage of a first pair of linkages coupled between the swashplate and the collective crosshead in a first direction; and moving a second linkage of the first pair of linkages coupled between the swashplate and the collective crosshead in a second direction opposite the first direction; and responsive to the movement of the first and second linkages, causing a plane of rotation of the pair of rotors of the tail rotor system to cant relative to a centerline of the mast.

13. The method of claim 12, wherein the collective crosshead comprises:

a body concentric with the mast and a trunnion disposed on the body;

wherein the trunnion comprises first and second shafts;

a first mixing lever disposed on the first shaft and a second mixing lever disposed on the second shaft.

14. The method of claim 13, wherein the tail rotor system comprises:

a first linkage of a second pair of linkages coupled between the first mixing lever and a first rotor of the pair of rotors; and a second linkage of the second pair of linkages coupled between the second mixing lever and a second rotor of the pair of rotors.

15. The method of claim 14, wherein the tail rotor system comprises a cyclic control system, the cyclic control system comprising:

an actuator coupled to the pivotable fixed ring;

a swashplate support coupled to the pivotable fixed ring and configured to allow the swashplate to pivot relative to the mast; and a swashplate drive linkage coupled between the rotatable ring and the mast and configured to transmit torque from the mast to the rotatable ring.

16. The method of claim 15, wherein the tail rotor system comprises a flight control computer communicatively coupled to the actuator to control the actuator.

17. The method of claim 16, wherein the step of pivoting the swashplate comprises the step of extending or contracting the actuator to pivot the pivotable fixed ring.

18. The method of claim 16, wherein a pitch of the helicopter is adjusted by the cyclic control system via adjustment of a vertical thrust vector of the tail rotor system.

19. The method of claim 16, wherein a center of gravity envelope of the helicopter is adjusted by the cyclic control system via adjustment of a vertical thrust vector of the tail rotor system.

20. The method of claim 16, wherein the tail rotor system generates additional downward thrust via adjustment of a vertical thrust vector of the tail rotor system.

* * * * *